UNITED STATES PATENT OFFICE 2,921,955
Patented Jan. 19, 1960

2,921,955

CARBONATE DERIVATIVES OF ETHANOLAMINES

Stanley R. Newman and Robert Y. Heisler, Fishkill, and Norman Alpert, Poughkeepsie, N.Y., assignors to Texaco Inc., a corporation of Delaware No Drawing. Application December 11, 1956
Serial No. 627,564

2 Claims. (Cl. 260—463)

This invention relates to novel derivatives of ethanolamines. More particularly, this invention relates to certain carbonate derivatives of ethanolamines valuable as softening and plasticizing agents for textiles and leather products and as engine cleanliness agents in motor fuels and lubricants. The novel compounds of this invention have the following general formula:

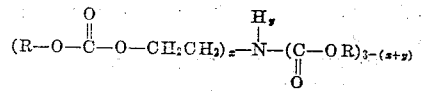

wherein R is an aliphatic hydrocarbon radical or an alkoxyalkyl radical having from 1 to 18 carbon atoms, $x$ is an integer ranging from 1 to 3, and $y$ is either 0 or 1.

Certain carbonate derivatives of diethanolamine are particularly useful as fuel and lubricating oil additives as disclosed in our co-pending applications Serial Nos. 627,563, now U.S. Patent No. 2,885,274, and 627,575, now U.S. Patent No. 2,887,452, filed of even date herewith.

The carbonate derivatives of ethanolamines of this invention are readily formed by a series of reactions involving the formation of a chloroformate by the reaction of phosgene with an alcohol or an ether alcohol, such as the Cellosolves and Carbitols, and subsequently reacting the formed chloroformate with a selected ethanolamine, (mono, di, or tri) in the presence of a hydrogen chloride acceptor, such as pyridine or quinoline.

The novel carbonate derivatives of ethanolamines of this invention are exemplified by the following:

N-β-butoxycarboxyethyl-N-butoxyformyl amine
N-β-ethoxyethoxycarboxyethyl - N - ethoxyethoxyformyl amine
N-β-hexadecoxycarboxyethyl-N-hexadecoxyformyl amine
N-β-alloxycarboxyethyl-N-alloxyformyl amine
N-β-pentoxycarboxyethyl-N-pentoxyformyl amine
N-β-propargoxycarboxyethyl-N-propargoxyformyl amine
N-β-ethoxycarboxyethyl-bis(N-ethoxyformyl)amine
N-β-alloxycarboxyethyl-bis(N-alloxyformyl)amine
N-β-propargoxycarboxyethyl - bis(N - progargoxyformyl) amine
N-β-methoxyethoxycarboxyethyl - bis(N - methoxyethoxyformyl)amine
N-β-pentoxycarboxyethyl-bis(N-pentoxyformyl)amine
bis(N - β - ethoxyethoxycarboxyethyl)-N-ethoxyethoxyformyl amine
bis(N - β - pentoxycarboxyethyl)-N-pentoxyformyl amine
bis(N-β-alloxycarboxyethyl)-N-alloxyformyl amine
bis(N-β-butoxyethoxycarboxyethyl)-N - butoxyethoxyformyl amine
tris(N-β-ethoxyethoxycarboxyethyl)amine
tris(N-β-pentoxycarboxyethyl)amine
tris(N-β-alloxycarboxyethyl)amine
tris(N-β-propargoxycarboxyethyl)amine
tris(N-β-2-ethylhexoxycarboxyethyl)amine
tris(N-β-(octadecoxycarboxyethyl)amine The following examples illustrate the preparation of the carbonate derivatives of ethanolamines of this invention.

EXAMPLE I

The preparation of N-β-ethoxyethoxycarboxyethyl-N-ethoxyethoxyformyl amine which may also be termed ethoxyethylurethane of monoethanolamine ethoxyethyl carbonate was carried out as follows: 165 g. (2.7 moles) of ethanolamine and 725 g. pyridine were added to a five liter, three necked flask which was immersed in an ice-salt bath. The flask was equipped with a mechanical stirrer, a condenser, and an addition funnel. 1325 g. (8.64 moles) of ethoxyethyl chloroformate was added dropwise to the ethanolamine-pyridine solution at a rate designed to keep the temperature below 50° F. After the addition the product was mechanically stirred overnight and allowed to come up to room temperature. 500 ml. of water was then added to dissolve the pyridine hydrochloride formed. The aqueous layer was then separated and the product washed with one liter of a 10 percent hydrochloric acid solution. The product was then washed four times with a saturated salt solution and finally washed with an aqueous sodium bicarbonate solution. The product was dried, filtered, stripped of light ends at a pot temperature of 400° F. for two hours at 300 microns pressure and then weighed.

An infrared spectrum of the sample showed the doublet carbonyl absorption to be between 5.7 and 5.9 microns, which appears to be characteristic of this type of urethane compound, and the singlet absorption at 8.0 microns, which is characteristic of organic carbonates. The spectrum analysis also indicated the presence of the unsubstituted —N—H bond at 3.0 microns. The product, N-β - ethoxyethoxycarboxyethyl - N - ethoxyethoxyformyl amine, weighed 746 g. and had the following formula:

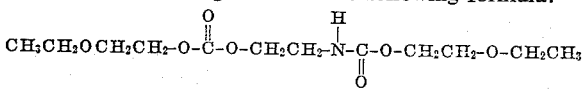

The results of further analysis of this product are seen in Table I, following.

EXAMPLE II

The preparation of bis(N-β-ethoxyethoxycarboxyethyl)-N-ethoxyethoxyformyl amine, which may also be termed ethoxyethyl urethane of diethanolamine bis(ethoxyethyl carbonate), was carried out in the following manner: 1800 g. (20 moles) of ethoxyethanol (Cellosolve) was added to a five liter, three necked flask in an ice-salt bath which was equipped with a mechanical stirrer, an air condenser, and a gas inlet tube. 4 lbs., 7 oz. of phosgene was introduced into the reaction flask at a rate such that the temperature remained below 50° F. The resulting product was stirred for about 15 hours. Thereafter, 600 ml. of water was added and the mixture separated into two layers. The product layer was washed four times with water and was thereafter dried for about 15 hours over anhydrous $CaSO_4$, filtered, and weighed. The product ethoxyethyl chloroformate, weighed 2640 g. signifying a yield of 86 percent. The 2640 g. of ethoxyethyl chloroformate was added slowly to a mixture of 546 g. of diethanolamine and 1478 g. of pyridine in a vessel chilled in an ice-salt bath at such a rate that the temperature remained below 50° F. The resulting reaction mixture was stirred for about 15 hours and 600 ml. of water was then added to decompose the formed pyridine hydrochloride. The product was separated, washed with a 10 percent solution of hydrochloric acid followed by washing with a saturated sodium chloride solution until neutral. The product was dried for about 15 hours over $CaSO_4$, filtered, and weighed. The resulting product, bis(N-β-ethoxyethoxycarboxyethyl)-N-ethoxyethoxyformyl amine, weighed 2100 g. and had the following formula:

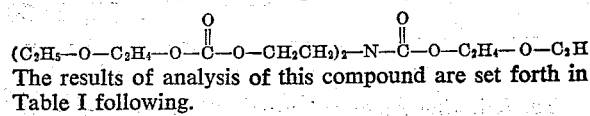

$$(C_2H_5-O-C_2H_4-O-\overset{O}{\underset{\|}{C}}-O-CH_2CH_2)_2-N-\overset{O}{\underset{\|}{C}}-O-C_2H_4-O-C_2H_5$$

The results of analysis of this compound are set forth in Table I following.

EXAMPLE III

The preparation of bis(N-β-pentoxycarboxyethyl)-N-pentoxyformyl amine which may also be termed, n-amyl urethane of diethanolamine bis(n-amyl carbonate), was as follows: 1760 g. (20 moles) of n-amyl alcohol was placed in a five liter, three necked flask equipped with a mechanical stirrer, an air condenser, and a gas inlet tube. The five liter flask was immersed in an ice-salt bath. 4 lbs., 8 oz. of phosgene was then bubbled in at such a rate that the temperature was held below 50° F. The reaction mixture was then stirred for about 15 hours after which 600 ml. of water was added. The mixture then separated into two layers. The product layer was washed four times with water and the product was dried overnight with CaSO₄, filtered, and weighed. The product, n-amyl chloroformate, weighed 2885 g. indicating a yield of 95 percent for this product.

2250 g. of n-amyl chloroformate was added slowly to a mixture of 472 g. (4.5 moles) of diethanolamine and 1277 g. of pyridine in an ice-salt bath at such a rate that the temperature of the reaction mixture was held below 50° F. The reaction mixture was stirred for about 15 hours after which 600 ml. of water was added to dissolve the pyridine hydrochloride. The two layers which had formed were separated and the product washed once with a 10 percent HCl solution followed by washing with a saturated NaCl solution until neutral. The resulting dark colored product was diluted with benzene and treated with "Filtrol" to form a dilute slurry. The slurry was allowed to stand for about 15 hours and thereafter filtered. The filtrate was subjected to distillation at a temperature of 225° C. at 500 microns pressure. The product, bis(N-β-pentoxycarboxyethyl)-N-pentoxyformyl amine, weighed 1636 g. and had the following formula:

$$(C_5H_{11}-O-\overset{O}{\underset{\|}{C}}-O-CH_2CH_2)_2-N-\overset{O}{\underset{\|}{C}}-O-C_5H_{11}$$

The results of analysis of this compound are set forth in Table I following.

EXAMPLE IV

The preparation of tris(N-β-pentoxycarboxyethyl)-amine was as follows: 1760 g. (20 moles) of n-amyl alcohol was placed in a five liter, three necked flask equipped with a mechanical stirrer, an air condenser, and a gas inlet tube. The flask was immersed in an ice-salt bath so that the temperature of reaction could be maintained below 50° F. 4 lbs., 8 oz. (20 moles plus 2 oz. excess) of phosgene was then bubbled into the system over a period of 8 hours. The resulting mixture was allowed to warm to room temperature overnight. 600 ml. of water was then added, the two resulting layers separated, and the product layer washed four times with water. The product was then dried over anhydrous calcium sulfate and filtered. The resulting yield of dried filtered chloroformate was 2690 g. (93 percent of the theoretical yield).

2,260 g. (25.9 moles) of n-amyl chloroformate was added slowly to a mixture of 700 g. (4.7 moles) of triethanolamine and 1200 g. of pyridine at a temperature below 50° F. with stirring in an ice-salt bath. Water was added to the reaction mixture to dissolve the pyridine hydrochloride which had formed. The resulting product was washed with a 10 percent hydrochloric acid solution until distinctly acid and then washed with a saturated sodium chloride solution until almost neutral. Dry sodium bicarbonate was then added until no more carbon dioxide was given off. The product was then washed once with water and then dried over anhydrous sodium sulfate. The product was stripped to remove any n-amyl alcohol, chloroformate, or triethanolamine by utilizing an overhead temperature of 248° F. and a pot temperature (jacket) of 460° F. The product was decolorized with Norite, filtered, and weighed. The product, tris(N-β-pentoxycarboxyethyl)amine, weighed 1669 g. and had the following formula:

$$(C_5H_{11}-O-\overset{O}{\underset{\|}{C}}-O-CH_2CH_2)_3-N$$

The results of analysis of this compound are given in the following table.

Table I following sets forth the product yield based on the amount theoretically obtainable, the actual or analyzed percent of carbon, hydrogen, and nitrogen obtained compared with the theoretical percent of those elements present in the compound, and the refractive index of each compound.

Table I

| Compound | Product yield, percent | Carbon, percent | | Hydrogen, percent | | Nitrogen, percent | | Molecular Weight | | Refractive Index At 20° C. |
|---|---|---|---|---|---|---|---|---|---|---|
| | | anal. | theo. | anal. | theo. | anal. | theo. | anal. | theo. | |
| N-β-ethoxyethoxycarboxy-ethyl-N-ethoxyethoxyformyl amine; C₁₂H₂₃O₇N | 90 | 50.2 | 49.2 | 7.9 | 7.9 | 4.4 | 4.7 | 306 | 293 | 1.4528 |
| bis(N-β-ethoxyethoxycarboxyethyl)-N-ethoxyethoxyformyl amine; C₁₉H₃₅O₁₁N | 89 | 49.8 | 50.2 | 7.8 | 7.7 | (¹) | (¹) | (¹) | (¹) | 1.4480 |
| bis(N-β-pentoxycarboxyethyl)-N-pentoxyformyl amine; C₂₂H₄₁O₈N | 82 | 59.4 | 59.2 | 9.3 | 9.2 | 3.15 | 3.14 | (¹) | (¹) | 1.4455 |
| tris(N-β-pentoxycarboxyethyl)-amine; C₂₄H₄₅O₉N | 72 | 58.4 | 58.8 | 9.18 | 9.18 | 2.94 | 2.86 | 459 | 491 | 1.4509 |

¹ No determination made.

The results of the analysis of these compounds as indicated in the above table show conclusively that the products produced in the preceding examples are those identified by name and formula and which come within the scope of the present invention.

Obviously, many modifications and variations of the invention, as hereinbefore set forth, may be made without departing from the spirit and scope thereof and, therefore, only such limitations should be imposed as are indicated in the appended claims.

We claim:

1. Carbonate derivatives of ethanolamines having the following general formula:

$$R-O-\overset{O}{\underset{\|}{C}}-O-CH_2CH_2-\overset{H}{\underset{|}{N}}-\overset{}{\underset{\|}{C}}-OR$$
$$\phantom{R-O-C-O-CH_2CH_2-N-}O$$

wherein R is a saturated alkoxyalkyl radical having from 2 to 18 carbon atoms.

2. N-β-ethoxyethoxycarboxyethyl-N-ethoxyethoxyformyl amine.

References Cited in the file of this patent

UNITED STATES PATENTS 2,568,608    Bralley    Sept. 18, 1951
2,684,381    Dial    July 20, 1954

UNITED STATES PATENT OFFICE

CERTIFICATE OF CORRECTION

Patent No. 2,921,955                  January 19, 1960

Stanley R. Newman et al.

It is hereby certified that error appears in the printed specification of the above numbered patent requiring correction and that the said Letters Patent should read as corrected below.

Column 3, line 2, extreme right-hand portion of the formula, for "$-C_2H$" read -- $-C_2H_5$ --.

Signed and sealed this 28th day of June 1960.

(SEAL)
Attest:
KARL H. AXLINE
Attesting Officer

ROBERT C. WATSON
Commissioner of Patents